United States Patent
Ahonen et al.

(10) Patent No.: US 9,202,108 B2
(45) Date of Patent: Dec. 1, 2015

(54) METHODS AND APPARATUSES FOR FACILITATING FACE IMAGE ANALYSIS

(75) Inventors: Timo Juhani Ahonen, Redwood City, CA (US); Gabriel Takacs, Santa Clara, CA (US)

(73) Assignee: Nokia Technologies Oy, Espoo (FI)

( * ) Notice: Subject to any disclaimer, the term of this patent is extended or adjusted under 35 U.S.C. 154(b) by 118 days.

(21) Appl. No.: 13/446,493

(22) Filed: Apr. 13, 2012

(65) Prior Publication Data

US 2013/0272583 A1 Oct. 17, 2013

(51) Int. Cl.
*G06K 9/00* (2006.01)
*H04N 1/411* (2006.01)

(52) U.S. Cl.
CPC ............ *G06K 9/00281* (2013.01); *H04N 1/411* (2013.01)

(58) Field of Classification Search
None
See application file for complete search history.

(56) References Cited

U.S. PATENT DOCUMENTS

| | | | |
|---|---|---|---|
| 7,428,330 B2 * | 9/2008 | Blake et al. | 382/154 |
| 7,558,763 B2 | 7/2009 | Zhao et al. | |
| 2006/0204103 A1 | 9/2006 | Mita et al. | |
| 2008/0166026 A1 | 7/2008 | Huang et al. | |
| 2009/0022472 A1 | 1/2009 | Bronstein et al. | |
| 2009/0041128 A1 * | 2/2009 | Howard | 375/240.24 |
| 2009/0252435 A1 | 10/2009 | Wen et al. | |
| 2010/0226575 A1 | 9/2010 | Grzeszczuk et al. | |
| 2010/0303343 A1 * | 12/2010 | Lee et al. | 382/159 |
| 2010/0303354 A1 * | 12/2010 | Reznik | 382/168 |
| 2010/0310174 A1 | 12/2010 | Reznik | |
| 2011/0170780 A1 | 7/2011 | Vaddadi et al. | |
| 2011/0206246 A1 | 8/2011 | Wolf et al. | |
| 2011/0216977 A1 * | 9/2011 | Yu et al. | 382/190 |
| 2011/0229041 A1 * | 9/2011 | Yu et al. | 382/191 |
| 2011/0293189 A1 | 12/2011 | Sun et al. | |

FOREIGN PATENT DOCUMENTS

WO WO 2011/119117 A1 9/2011

OTHER PUBLICATIONS

International Search Report and Written Opinion for Application No. PCT/FI2013/050334, dated Jul. 10, 2013.

Ahonen, T.; "Face and Texture Image Analysis With Quantized Filter Response Statistics"; No. C 330; Faculty of Technology; Department of Electrical and Information Engineering; University of Oulu; Finland; 2009.

Ahonen, T., et al.; "Face Description with Local Binary Patterns: Application to Face Recognition"; IEEE Transactions on Pattern Analysis and Machine Intelligence; vol. 28; Issue 12; Dec. 2006; pp. 2037-2041.

Ahonen, T., et al.; "Face Recognition with Local Binary Patterns"; Proceedings of Eighth European Conference on Computer Vision, Prague, Czech Republic; May 2004; pp. 469-481.

(Continued)

*Primary Examiner* — Siamak Harandi
(74) *Attorney, Agent, or Firm* — Alston & Bird LLP

(57) ABSTRACT

Methods and apparatuses are provided for facilitating face image analysis. A method may include determining a histogram-based face descriptor for each of a plurality of regions of a face image. The method may further include compressing the histogram-based face descriptors to generate a plurality of compressed face descriptors describing the plurality of regions of the face image. Corresponding apparatuses are also provided.

19 Claims, 4 Drawing Sheets

(56) References Cited

OTHER PUBLICATIONS

Chan, C.H.; "Multi-scale Local Binary Pattern Histogram for Face Recognition"; Centre for Vision, Speech and Signal Processing; School of Electronics and Physical Sciences; University of Surrey; United Kingdom; Sep. 2008.

Chandrasekhar, V., et al.; "CHoG: Compressed Histogram of Gradients"; IEEE International Conference on Computer Vision and Pattern Recognition, Miami Beach, Florida; Jun. 2009.

Demirel, H., et al.; "Probability Distribution Functions Based Face Recognition System Using Discrete Wavelet Subbands"; No. 6; Department of Electrical and Electronic Engineering; Eastern Mediterranean University; Turkey; 2011.

Ekenel, H.K., et al.; "Local Binary Pattern Domain Local Appearance Face Recognition"; Proc IEEE 16th Intl Conf on Signal Processing Communication and Applications; Apr. 2008; pp. 1-4.

Zhao, J., et al.; "LBP Discriminant Analysis for Face Verification"; Proceedings of the IEEE Computer Society Conference on Computer Vision and Pattern Recognition; San Diego, CA; Jun. 2005.

* cited by examiner

METHODS AND APPARATUSES FOR FACILITATING FACE IMAGE ANALYSIS

TECHNOLOGICAL FIELD

Embodiments of the present invention relate generally to image processing technology and, more particularly, relate to methods and apparatuses for facilitating face image analysis.

BACKGROUND

Face image analysis, such as face detection, face recognition, and face tracking is becoming an increasingly more important technology. In this regard, for example, face detection may be useful in biometrics, user interface, gaming and other areas such as creating context for accessing communities in the mobile domain. Advancement in computing power of microprocessors has also made facial analysis functionality available on mobile devices, such as cell phones and other smart devices. Facial analysis may also be important going forward in relation to initiatives such as metadata standardization.

Although face analysis techniques continue to improve, many current methods require either a high computation capability or suffer from limited face detection performance. Accordingly, the tendency for developing devices with continued increases in their capacity to create content, store content and/or receive content relatively quickly upon request, the trend toward electronic devices (e.g., mobile electronic devices such as mobile phones) becoming increasingly ubiquitous in the modern world, and the drive for continued improvements in interface and access mechanisms to unlock the capabilities of such devices, may make it desirable to provide further improvements in the area of face image analysis.

BRIEF SUMMARY

Methods, apparatuses, and computer program products are herein provided for facilitating face image analysis. Systems, methods, apparatuses, and computer program products in accordance with various embodiments may provide several advantages to computing devices and computing device users. Some example embodiments provide for compression of face descriptors that may be used in face image analysis. In this regard, some example embodiments address the problem of the traditionally large size of face descriptors used in face image analysis, which inhibits the transmission and storage of face descriptors. Some example embodiments provide for a 50-fold reduction in the size of a face descriptor through compression without significantly affecting the effectiveness of the face descriptor for usage in face detection and/or other face analysis functions. Accordingly some example embodiments reduce memory footprint and storage access latency. Further, some example embodiments reduce network bandwidth consumption and round trip time in systems in which face descriptors are sent over a network to a remote device to facilitate face image analysis.

In a first example embodiment, a method is provided, which comprises determining a histogram-based face descriptor for each of a plurality of regions of a face image. The method of this example embodiment further comprises compressing the histogram-based face descriptors to generate a plurality of compressed face descriptors describing the plurality of regions of the face image.

In another example embodiment, an apparatus is provided. The apparatus of this embodiment comprises at least one processor and at least one memory storing computer program code, wherein the at least one memory and stored computer program code are configured, with the at least one processor, to cause the apparatus to at least determine a histogram-based face descriptor for each of a plurality of regions of a face image. The at least one memory and stored computer program code are configured, with the at least one processor, to further cause the apparatus of this example embodiment to compress the histogram-based face descriptors to generate a plurality of compressed face descriptors describing the plurality of regions of the face image.

In another example embodiment, a computer program product is provided. The computer program product of this embodiment includes at least one computer-readable storage medium having computer-readable program instructions stored therein. The program instructions of this example embodiment comprise program instructions configured to determine a histogram-based face descriptor for each of a plurality of regions of a face image. The program instructions of this embodiment further comprise program instructions configured to compress the histogram-based face descriptors to generate a plurality of compressed face descriptors describing the plurality of regions of the face image.

In another example embodiment, an apparatus is provided that comprises means for determining a histogram-based face descriptor for each of a plurality of regions of a face image. The apparatus of this example embodiment further comprises means for compressing the histogram-based face descriptors to generate a plurality of compressed face descriptors describing the plurality of regions of the face image.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE DRAWINGS

Figure 1:
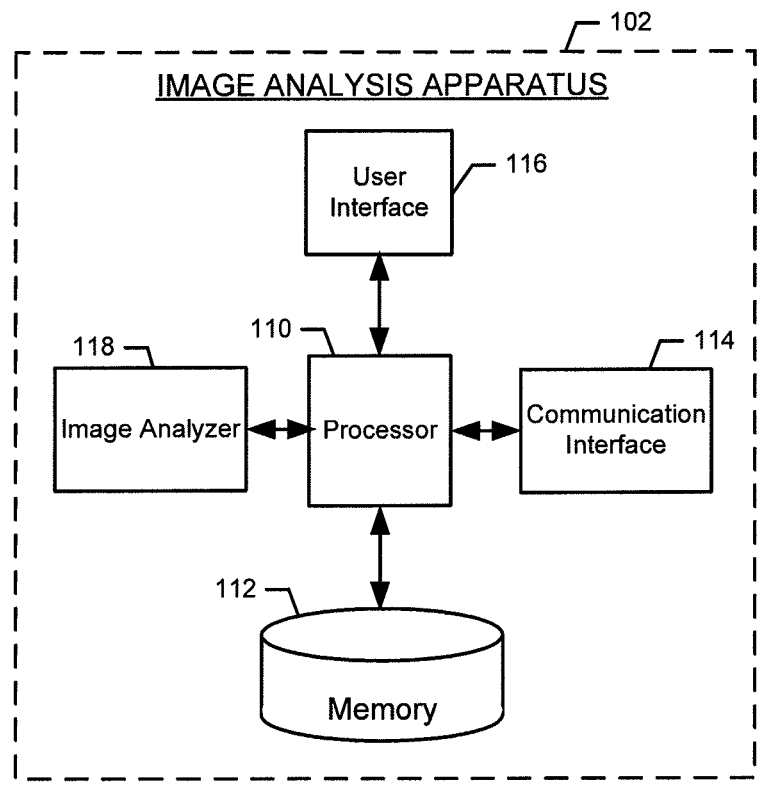
Figure 2:
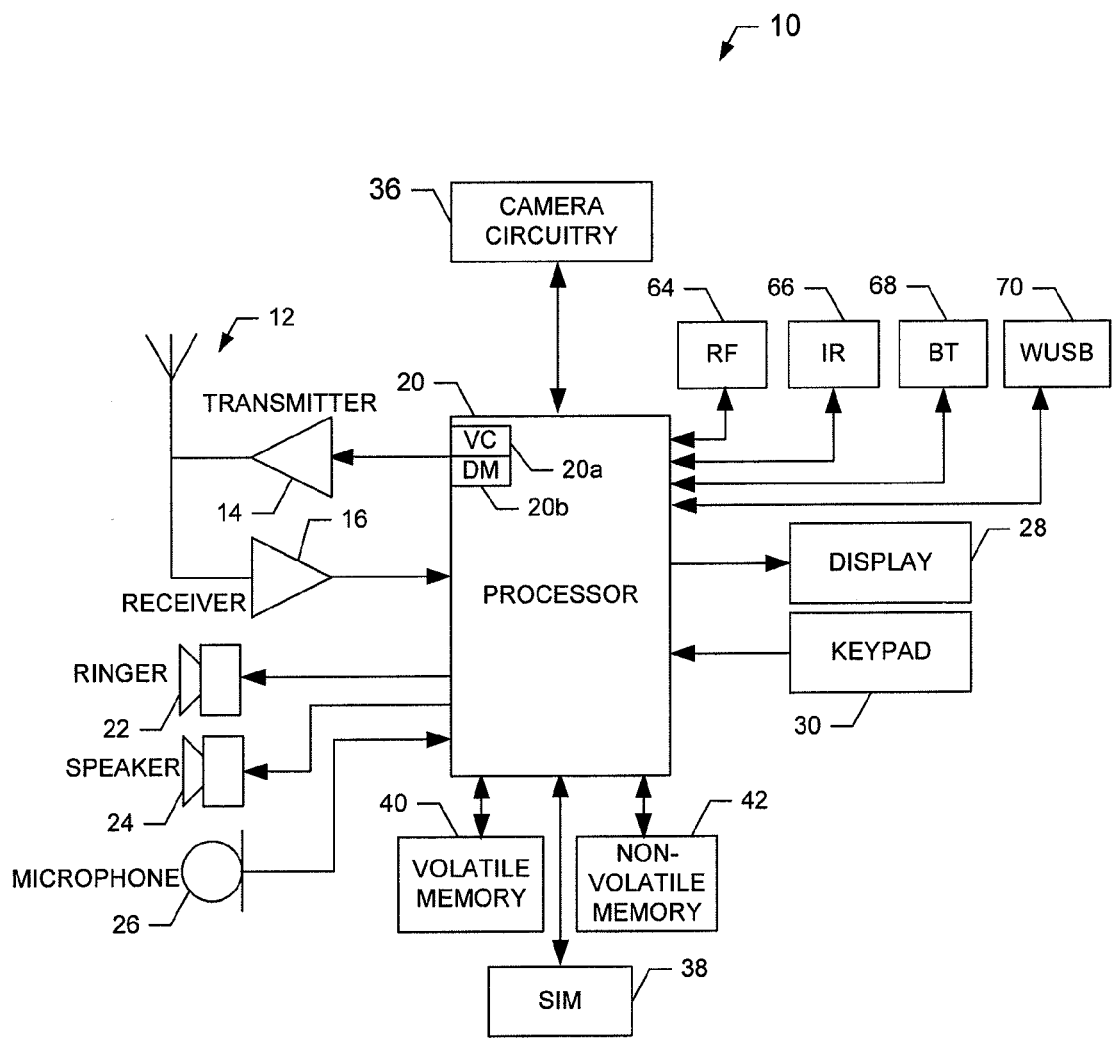
Figure 3:
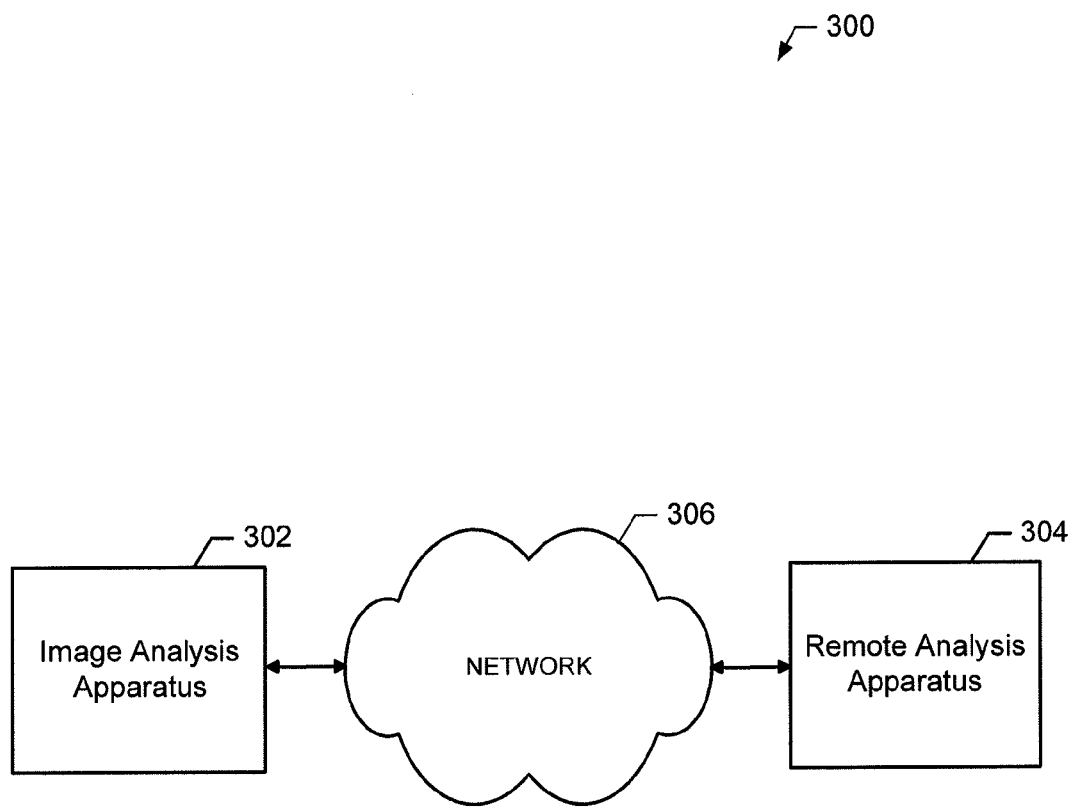
Figure 4:
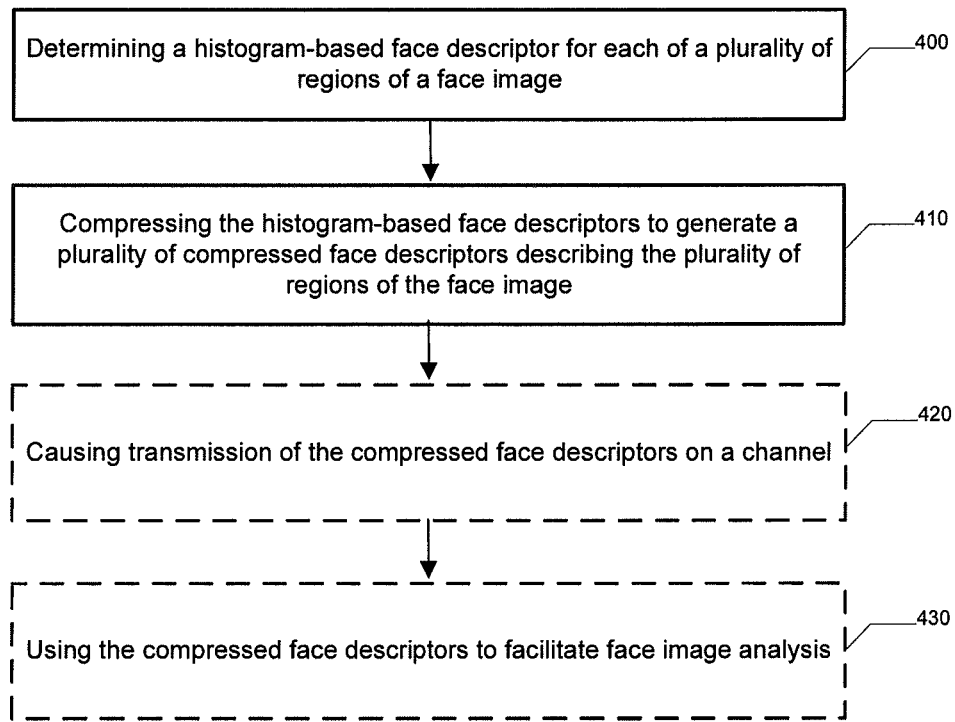

Having thus described embodiments of the invention in general terms, reference will now be made to the accompanying drawings, which are not necessarily drawn to scale, and wherein:

FIG. 1 illustrates a block diagram of an image analysis apparatus according to some example embodiments;

FIG. 2 is a schematic block diagram of a mobile terminal according to some example embodiments;

FIG. 3 illustrates a system for facilitating face image analysis according to some example embodiments; and FIG. 4 illustrates a flowchart according to an example method for facilitating face image analysis according to some example embodiments.

DETAILED DESCRIPTION

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, and/or the like. Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, and/or the like.

As used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

FIG. 1 illustrates a block diagram of an image analysis apparatus 102 according to an example embodiment of the present invention. It will be appreciated that the image analysis apparatus 102 is provided as an example of one embodiment of the invention and should not be construed to narrow the scope or spirit of the invention in any way. In this regard, the scope of the disclosure encompasses many potential embodiments in addition to those illustrated and described herein. As such, while FIG. 1 illustrates one example of a configuration of an apparatus, other configurations may also be used to implement embodiments of the present invention.

The image analysis apparatus 102 may be embodied as a desktop computer, laptop computer, mobile terminal, mobile computer, mobile phone, mobile communication device, tablet computing device, one or more servers, one or more network nodes, game device, digital camera/camcorder, audio/video player, television device, radio receiver, digital video recorder, positioning device, any combination thereof, and/or the like. In an example embodiment, the image analysis apparatus 102 is embodied as a mobile terminal, such as that illustrated in FIG. 2.

In this regard, FIG. 2 illustrates a block diagram of a mobile terminal 10 representative of one embodiment of an image analysis apparatus 102. It should be understood, however, that the mobile terminal 10 illustrated and hereinafter described is merely illustrative of one type of image analysis apparatus 102 that may implement and/or benefit from embodiments of the present invention and, therefore, should not be taken to limit the scope of the present invention. While several embodiments of the electronic device are illustrated and will be hereinafter described for purposes of example, other types of electronic devices, such as mobile telephones, mobile computers, portable digital assistants (PDAs), pagers, laptop computers, desktop computers, gaming devices, televisions, and other types of electronic systems, may employ embodiments of the present invention.

As shown, the mobile terminal 10 may include an antenna 12 (or multiple antennas 12) in communication with a transmitter 14 and a receiver 16. The mobile terminal 10 may also include a processor 20 configured to provide signals to and receive signals from the transmitter and receiver, respectively. The processor 20 may, for example, be embodied as various means including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments the processor 20 comprises a plurality of processors. These signals sent and received by the processor 20 may include signaling information in accordance with an air interface standard of an applicable cellular system, and/or any number of different wireline or wireless networking techniques, comprising but not limited to Wireless-Fidelity (Wi-Fi), wireless local access network (WLAN) techniques such as Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5 G, third-generation (3G) communication protocols, fourth-generation (4G) communication protocols, Internet Protocol Multimedia Subsystem (IMS) communication protocols (e.g., session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5 G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3 fourth-generation (4G) wireless communication protocols such as Long Term Evolution (LTE) or Evolved Universal Terrestrial Radio Access Network (E-UTRAN) and/or the like, as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (e.g., digital/analog or TDMA/CDMA/analog phones). Additionally, the mobile terminal 10 may be capable of operating according to Wireless Fidelity (Wi-Fi) or Worldwide Interoperability for Microwave Access (WiMAX) protocols.

It is understood that the processor 20 may comprise circuitry for implementing audio/video and logic functions of the mobile terminal 10. For example, the processor 20 may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder (VC) 20a, an internal data modem (DM) 20b, and/or the like. Further, the processor may comprise functionality to operate one or more software programs, which may be stored in memory. For example, the processor 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive web content across the interne or other networks.

The mobile terminal 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions (e.g., software and/or firmware) stored on a memory accessible to the processor 20 (e.g., volatile memory 40, non-volatile memory 42, and/or the like). Although not shown, the mobile terminal may comprise a battery for powering various circuits related to the mobile terminal, for example, a circuit to provide mechanical vibration as a detectable output. The user input interface may comprise devices allowing the mobile terminal to receive data, such as a keypad 30, a touch display (not shown), a joystick (not shown), and/or other input device. In embodiments including a keypad, the keypad may comprise numeric (0-9) and related keys (#, *), and/or other keys for operating the mobile terminal.

As shown in FIG. 2, the mobile terminal 10 may also include one or more means for sharing and/or obtaining data. For example, the mobile terminal may comprise a short-range radio frequency (RF) transceiver and/or interrogator 64 so data may be shared with and/or obtained from electronic devices in accordance with RF techniques. The mobile terminal may comprise other short-range transceivers, such as, for example, an infrared (IR) transceiver 66, a Bluetooth™ (BT) transceiver 68 operating using Bluetooth™ brand wireless technology developed by the Bluetooth™ Special Interest Group, a wireless universal serial bus (USB) transceiver 70 and/or the like. The Bluetooth™ transceiver 68 may be capable of operating according to ultra-low power Bluetooth™ technology (e.g., Wibree™) radio standards. In this regard, the mobile terminal 10 and, in particular, the short-range transceiver may be capable of transmitting data to and/or receiving data from electronic devices within a proximity of the mobile terminal, such as within 10 meters, for example. Although not shown, the mobile terminal may be capable of transmitting and/or receiving data from electronic devices according to various wireless networking techniques, including Wi-Fi, WLAN techniques such as IEEE 802.11 techniques, IEEE 802.15 techniques, IEEE 802.16 techniques, and/or the like.

The mobile terminal 10 may include a media capturing element, such as a camera, video and/or audio module, in communication with the processor 20. The media capturing element may comprise any means for capturing an image, video and/or audio for storage, display or transmission. For example, in an example embodiment in which the media capturing element comprises camera circuitry 36, the camera circuitry 36 may include a digital camera configured to form a digital image file from a captured image. In addition, the digital camera of the camera circuitry 36 may be configured to capture a video clip. As such, the camera circuitry 36 may include all hardware, such as a lens or other optical component(s), and software necessary for creating a digital image file from a captured image as well as a digital video file from a captured video clip. Alternatively, the camera circuitry 36 may include only the hardware needed to view an image, while a memory device of the mobile terminal 10 stores instructions for execution by the processor 20 in the form of software necessary to create a digital image file from a captured image. As yet another alternative, an object or objects within a field of view of the camera circuitry 36 may be displayed on the display 28 of the mobile terminal 10 to illustrate a view of an image currently displayed which may be captured if desired by the user. As such, a captured image may, for example, comprise an image captured by the camera circuitry 36 and stored in an image file. As another example, a captured image may comprise an object or objects currently displayed by a display or viewfinder of the mobile terminal 10, but not necessarily stored in an image file. In an example embodiment, the camera circuitry 36 may further include a processing element such as a co-processor configured to assist the processor 20 in processing image data and an encoder and/or decoder for compressing and/or decompressing image data. The encoder and/or decoder may encode and/or decode according to, for example, a joint photographic experts group (JPEG) standard, a moving picture experts group (MPEG) standard, or other format.

The mobile terminal 10 may comprise memory, such as a subscriber identity module (SIM) 38, a removable user identity module (R-UIM), and/or the like, which may store information elements related to a mobile subscriber. In addition to the SIM, the mobile terminal may comprise other removable and/or fixed memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (e.g., hard disks, floppy disk drives, magnetic tape, etc.), optical disc drives and/or media, non-volatile random access memory (NVRAM), and/or the like. Like volatile memory 40 non-volatile memory 42 may include a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Returning to FIG. 1, in an example embodiment, the image analysis apparatus 102 includes various means for performing the various functions herein described. These means may comprise one or more of a processor 110, memory 112, communication interface 114, user interface 116, or image analyzer 118. The means of the image analysis apparatus 102 as described herein may be embodied as, for example, circuitry, hardware elements (e.g., a suitably programmed processor, combinational logic circuit, and/or the like), a computer program product comprising a computer-readable medium (e.g. memory 112) storing computer-readable program instructions (e.g., software or firmware) that are executable by a suitably configured processing device (e.g., the processor 110), or some combination thereof.

In some example embodiments, one or more of the means illustrated in FIG. 1 may be embodied as a chip or chip set. In other words, the image analysis apparatus 102 may comprise one or more physical packages (for example, chips) including materials, components and/or wires on a structural assembly (for example, a baseboard). The structural assembly may provide physical strength, conservation of size, and/or limitation of electrical interaction for component circuitry included thereon. In this regard, the processor 110, memory 112, communication interface 114, user interface 116, and/or image analyzer 118 may be embodied as a chip or chip set. The image analysis apparatus 102 may therefore, in some example embodiments, be configured to implement example embodiments of the present invention on a single chip or as a single "system on a chip." As another example, in some example embodiments, the image analysis apparatus 102 may comprise component(s) configured to implement embodiments of the present invention on a single chip or as a single "system on a chip." As such, in some cases, a chip or chipset may constitute means for performing one or more operations for providing the functionalities described herein and/or for enabling user interface navigation with respect to the functionalities and/or services described herein.

The processor 110 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), one or more other hardware processors, or some combination thereof. Accordingly, although illustrated in FIG. 1 as a single processor, in some example embodiments the processor 110 may comprise a plurality of processors. The plurality of processors may be in operative communication with each other and may be collectively configured to perform one or more functionalities of the image analysis apparatus 102 as described herein. The plurality of processors may be embodied on a single computing device or distributed across a plurality of computing devices collectively configured to function as the image analysis apparatus 102. In embodiments wherein the image analysis apparatus 102 is embodied as a mobile terminal 10, the processor 110 may be embodied as or may comprise the processor 20. In some example embodiments, the processor 110 is configured to execute instructions stored in the memory 112 or otherwise accessible to the processor 110. These instructions, when executed by the processor 110, may cause the image analysis apparatus 102 to perform one or more of the functionalities of the image analysis apparatus 102 as described herein. As such, whether configured by hardware or software methods, or by a combination thereof, the processor 110 may comprise an entity capable of performing operations according to embodiments of the present invention while configured accordingly. Thus, for example, when the processor 110 is embodied as an ASIC, FPGA or the like, the processor 110 may comprise specifically configured hardware for conducting one or more operations described herein. Alternatively, as another example, when the processor 110 is embodied as an executor of instructions, such as may be stored in the memory 112, the instructions may specifically configure the processor 110 to perform one or more algorithms and operations described herein.

The memory 112 may comprise, for example, volatile memory, non-volatile memory, or some combination thereof. In this regard, the memory 112 may comprise a non-transitory computer-readable storage medium. Although illustrated in FIG. 1 as a single memory, the memory 112 may comprise a plurality of memories. The plurality of memories may be embodied on a single computing device or may be distributed across a plurality of computing devices collectively configured to function as the image analysis apparatus 102. In various example embodiments, the memory 112 may comprise a hard disk, random access memory, cache memory, flash memory, a compact disc read only memory (CD-ROM), digital versatile disc read only memory (DVD-ROM), an optical disc, circuitry configured to store information, or some combination thereof. In embodiments wherein the image analysis apparatus 102 is embodied as a mobile terminal 10, the memory 112 may comprise the volatile memory 10 and/or the non-volatile memory 12. The memory 112 may be configured to store information, data, applications, instructions, or the like for enabling the image analysis apparatus 102 to carry out various functions in accordance with various example embodiments. For example, in some example embodiments, the memory 112 may be configured to buffer input data for processing by the processor 110. Additionally or alternatively, the memory 112 may be configured to store program instructions for execution by the processor 110. The memory 112 may store information in the form of static and/or dynamic information. This stored information may be stored and/or used by the image analyzer 118 during the course of performing its functionalities.

The communication interface 114 may be embodied as any device or means embodied in circuitry, hardware, a computer program product comprising a computer-readable medium (for example memory 112) storing computer-readable program instructions (for example, software or firmware) that are executable by a suitably configured processing device (for example, the processor 110), or a combination thereof that is configured to receive and/or transmit data from/to another computing device. According to some example embodiments, the communication interface 114 may be at least partially embodied as or otherwise controlled by the processor 110. In this regard, the communication interface 114 may be in communication with the processor 110, such as via a bus. The communication interface 114 may include, for example, an antenna, a transmitter, a receiver, a transceiver and/or supporting hardware or software for enabling communications with one or more computing devices. The communication interface 114 may be configured to receive and/or transmit data using any protocol that may be used for communications between computing devices. In this regard, the communication interface 114 may be configured to receive and/or transmit data using any protocol that may be used for transmission of data over a wireless network, wireline network, some combination thereof, or the like by which the image analysis apparatus 102 and one or more further computing devices may be in communication. The communication interface 114 may additionally be in communication with the memory 112, user interface 116, and/or image analyzer 118, such as via a bus(es). In some example embodiments, operation of the communication interface 114 may be at least partially controlled by the processor 110, memory 112, image analyzer 118, or some combination thereof. Accordingly, in some example embodiments, the processor 110, memory 112, image analyzer 118, or some combination thereof may be configured to cause the communication interface 116 and, by extension, the image analysis apparatus 102 to send data to another computing device, such as over a network or other interface by which the image analysis apparatus 102 and one or more other entities may be in communication.

The user interface 116 may be in communication with the processor 110 to receive an indication of a user input and/or to provide an audible, visual, mechanical, or other output to a user. As such, the user interface 116 may include, for example, a keyboard, a mouse, a joystick, a display, a touch screen display, a microphone, a speaker, and/or other input/output mechanisms. In embodiments wherein the user interface 116 comprises a touch screen display, the user interface 116 may additionally be configured to detect and/or receive an indication of a touch gesture or other input to the touch screen display. The user interface 116 may be in communication with the memory 112, communication interface 114, and/or image analyzer 118, such as via a bus(es).

The image analyzer 118 may be embodied as various means, such as circuitry, hardware, a computer program product comprising a computer-readable medium (for example memory 112) storing computer-readable program instructions (for example, software or firmware) that are executable by a suitably configured processing device (for example, the processor 110), or some combination thereof and, in some example embodiments, may be embodied as or otherwise controlled by the processor 110. In embodiments wherein the image analyzer 118 is embodied separately from the processor 110, the image analyzer 118 may be in communication with the processor 110. The image analyzer 118 may further be in communication with one or more of the memory 112, communication interface 114, or user interface 116, such as via a bus(es).

In some example embodiments, the image analyzer 118 may be configured to divide a face image into a plurality of regions. Additionally or alternatively, the image analyzer 118 of some example embodiments may be configured to accept a face image that has already been divided into a plurality of regions. The plurality of regions may be of any size or shape, and, in some embodiments, the size and/or shape of a first region may differ from the size and/or shape of a second region.

The image analyzer 118 may be further configured to determine a histogram-based face descriptor for each of the plurality of regions of the face image. In some example embodiments, the image analyzer 118 may be configured to determine a histogram-based face descriptor for a region of a face image at least in part by applying a local operator to the region and compute a distribution of responses to the local operator. By way of non-limiting example, the applied local operator may comprise a gradient operator, local binary pattern operator, and/or other suitable operator that may be used to determine a histogram-based descriptor for an image region. In some example embodiments, the image analyzer 118 may be configured to use a local binary pattern operator with four sampling points at a radius of two pixels. However, it will be appreciated that other local binary pattern operators and/or other local operators may be used within the scope of the disclosure.

The determined histogram-based face descriptors may, for example, comprise local binary pattern descriptors. However, it will be appreciated that any type of histogram-based face descriptor may be determined for an image region in addition to or in lieu of local binary pattern descriptors. By way of non-limiting example, the image analyzer 118 may be configured to determine a scale invariant feature transform (SIFT) descriptor, histogram of oriented gradients (HoG) descriptor, speeded up robust feature (SURF) descriptor, and/or the like in addition to or in lieu of a local binary pattern descriptor for an image region.

The image analyzer 118 may be further configured to compress a histogram-based face descriptor determined for the region of a face image to generate a compressed face descriptor describing the region of the face image. In this regard, the histogram-based face descriptors determined for a face image may be N bits per region, while the compressed face descriptors may be n bits, where n<N. The inventors of this application have demonstrated in experiments that the size of a test face descriptor may be reduced from 8.3 kB (kilobytes) to 0.14 kB (over a 50-fold reduction) through compression.

It will be appreciated that any appropriate compression technique or algorithm may be applied. In some example embodiments, compression of a histogram-based face descriptor may be performed with a lossy encoding scheme. However, it will be appreciated that embodiments are not limited to use of a lossy encoding scheme and that a lossless encoding scheme resulting in compression of a face descriptor may be applied in some example embodiments.

In some example embodiments, the image analyzer 118 may be configured to compress a histogram-based face descriptor at least in part by using probability distribution encoding to encode the histogram-based face descriptor. In this regard, the histogram-based face descriptor may be vector quantized such that the $L_1$-norm is preserved, and the histogram-based face descriptor may remain in the same probability simplex subspace. The quantized histogram-based face descriptor may be converted into a codeword through encoding such that the codeword length in bits is much smaller than the original histogram-based face descriptor length. Depending on the encoder used, the histogram may be re-binned prior to encoding. It will be appreciated that in embodiments using probability distribution encoding, any of a variety probability distribution encoding algorithms may be used. For example, Huffman tree coding, Gagie tree coding, and/or the like may be used to compress a histogram-based face descriptor.

The image analyzer 118 may be configured in some example embodiments to cause transmission of compressed face descriptors describing a face image on a channel. For example, the image analyzer 118 may be configured to cause storage of compressed face descriptors in a memory, such as the memory 112. As another example, the image analyzer 118 may be configured to cause compressed face descriptors over a network to a remote computing device, such as to facilitate performance of face image analysis by the remote computing device.

Referring now to FIG. 3, FIG. 3 illustrates an example system 300 for facilitating face image analysis in which compressed face descriptors may be sent over a network to a remote computing device. The system 300 may include an image analysis apparatus 302 and a remote analysis apparatus 304 configured to communicate over the network 306. The image analysis apparatus 302 may, for example, comprise an embodiment of the image analysis apparatus 102. The remote analysis apparatus 304 may comprise any computing device or plurality of computing devices configured to access the network 306 and receive and/or access compressed face descriptors that may be sent over the network 306 by the image analysis apparatus 302. The remote analysis apparatus 304 may, for example, be embodied as one or more servers, one or more network nodes, a cloud based computing system, a desktop computer, laptop computer, mobile terminal, mobile computer, mobile phone, mobile communication device, mobile terminal 10, game device, digital camera/camcorder, audio/video player, television device, radio receiver, digital video recorder, positioning device, any combination thereof, and/or the like. The network 306 may comprise a wireline network, wireless network (e.g., a cellular network, wireless local area network, wireless wide area network, some combination thereof, or the like), or a combination thereof, and in one embodiment comprises the internet.

The compressed face descriptors may be used in some example embodiments to facilitate analysis of face images. In this regard, the compressed face descriptors may be used to facilitate performance of classification, tracking, detection, recognition, and/or other analysis of face images. The analysis may, for example, be performed by the image analyzer 118 locally at the image apparatus 102.

Additionally or alternatively, analysis using compressed face descriptors may be performed at least in part by the remote analysis apparatus 304 of FIG. 3. In this regard, in some example embodiments, aspects of the image analyzer 118 may be distributed between the remote analysis apparatus 304 and image analysis apparatus 302 such that histogram-type face descriptors for a face image may be determined and compressed at the image analysis apparatus 302 and the compressed face descriptors may be sent to the remote analysis apparatus 304 such that the remote analysis apparatus 304 may use the compressed face descriptors to facilitate analysis of a face image. For example, the remote analysis apparatus 304 may store a large face image database, and a user may want to recognize a face in a photo that is stored on the image analysis apparatus 302. The image analysis apparatus 302 may be configured to determine histogram-based face descriptors to describe the face appearance in the photo and then compress the histogram-based face descriptors. The compressed face descriptors may be sent from the image analysis apparatus 302 to the remote analysis apparatus 304, and the remote analysis apparatus may search the face image database for a face image matching the descriptors, and, if match is found, may return the identity to the image analysis apparatus 302.

In some example embodiments, compressed face descriptors may be decompressed to facilitate performance of face image analysis. Additionally or alternatively, the image analyzer 118 of some example embodiments may be configured to use compressed face descriptors to perform face image analysis without decompressing the compressed face descriptors. By way of non-limiting example, a look-up table may be used to facilitate performance of image analysis without decompressing the compressed face descriptors. The input of the look-up table may, for example, be one or more compressed face descriptors, and the output may be indicative of a difference between uncompressed face descriptors. As an example, assume histogram-based face descriptor h1 is compressed as codeword C1 and histogram-based face descriptor h2 is compressed as C2. The look-up table element indexed by (C1, C2) may indicate the difference between h1 and h2.

FIG. 4 illustrates a flowchart according to an example method for facilitating face image analysis according to some example embodiments. The operations illustrated in and described with respect to FIG. 4 may, for example, be performed by, with the assistance of, and/or under the control of one or more of the processor 110, memory 112, communication interface 114, user interface 116, or image analyzer 118. Operation 400 may comprise determining a histogram-based face descriptor for each of a plurality of regions of a face image. The processor 110, memory 112, and/or image analyzer 118 may, for example, provide means for performing operation 400. Operation 410 may comprise compressing the histogram-based face descriptors to generate a plurality of compressed face descriptors describing the plurality of regions of the face image. The processor 110, memory 112, and/or image analyzer 118 may, for example, provide means for performing operation 410.

The method may optionally further comprise operation 420 and/or operation 430. Operation 420 may comprise causing transmission of the compressed face descriptors on a channel. For example, operation 420 may comprise causing the compressed face descriptors to be stored on a memory. Additionally or alternatively, as another example, operation 420 may comprise causing the compressed face descriptors to be sent to a remote computing device over a network. The processor 110, memory 112, communication interface 114, and/or image analyzer 118 may, for example, provide means for performing operation 420. Operation 430 may comprise using the compressed face descriptors to facilitate face image analysis. The processor 110, memory 112, communication interface 114, and/or image analyzer 118 may, for example, provide means for performing operation 410.

FIG. 4 is a flowchart of a system, method, and computer program product according to example embodiments of the invention. It will be understood that each block of the flowchart, and combinations of blocks in the flowchart, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by one or more memory devices of a mobile terminal, server, or other computing device and executed by a processor in the computing device. In some embodiments, the computer program instructions comprising the computer program product(s) which embody the procedures described above may be stored by memory devices of a plurality of computing devices. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function specified in the flowchart block(s). The computer program instructions of one or more computer program products may also be loaded onto a computer or other programmable apparatus (e.g., an image analysis apparatus 102) to cause a series of operations to be performed on the computer or other programmable apparatus to produce a computer-implemented process such that the instructions which execute on the computer or other programmable apparatus implement the functions specified in the flowchart block(s).

Accordingly, blocks of the flowcharts support combinations of means for performing the specified functions. It will also be understood that one or more blocks of the flowcharts, and combinations of blocks in the flowcharts, may be implemented by special purpose hardware-based computer systems which perform the specified functions, or combinations of special purpose hardware and computer program product(s).

The above described functions may be carried out in many ways. For example, any suitable means for carrying out each of the functions described above may be employed to carry out embodiments of the invention. In one embodiment, a suitably configured processor may provide all or a portion of the elements. In another embodiment, all or a portion of the elements may be configured by and operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed is:

1. A method comprising:
   determining a histogram-based face descriptor for each of a plurality of regions of a face image; and
   compressing, by a processor, the histogram-based face descriptors at least in part using probability distribution encoding to encode the histogram-based face descriptors to generate a plurality of compressed face descriptors describing the plurality of regions of the face image, wherein compressing the histogram-based face descriptors comprises ensuring that the plurality of compressed face descriptors remain in the same probability simplex subspace as the histogram-based face descriptors.

2. The method of claim 1, wherein the histogram-based face descriptors comprise local binary pattern descriptors.

3. The method of claim 1, further comprising causing transmission of the compressed face descriptors.

4. The method of claim 3, wherein causing transmission of the compressed face descriptors comprises causing storage of the compressed face descriptors in a memory.

5. The method of claim 3, wherein causing transmission of the compressed face descriptors comprises causing the compressed face descriptors to be sent over a network toward a remote computing device.

6. The method of claim 1, further comprising using the compressed face descriptors to perform image analysis without decompressing the compressed face descriptors.

7. The method of claim 6, wherein using the compressed face descriptors to perform image analysis without decompressing the compressed face descriptors comprises using a look-up table to determine an output indicative of a difference between two face descriptors being compared.

8. The method of claim 1, wherein determining the histogram-based face descriptors comprises applying a local operator to each of the plurality of regions of the face image and computing a distribution of responses to the local operator for each of the plurality of regions.

9. An apparatus comprising at least one processor and at least one memory storing computer program code, wherein the at least one memory and stored computer program code are configured, with the at least one processor, to cause the apparatus to at least:
   determine a histogram-based face descriptor for each of a plurality of regions of a face image; and
   compress the histogram-based face descriptors at least in part using probability distribution encoding to encode the histogram-based face descriptors to generate a plurality of compressed face descriptors describing the plurality of regions of the face image, wherein compressing the histogram-based face descriptors comprises ensuring that the plurality of compressed face descriptors remain in the same probability simplex subspace as the histogram-based face descriptors.

10. The apparatus according to claim 9, wherein the histogram-based face descriptors comprise local binary pattern descriptors.

11. The apparatus according to claim 9, wherein the at least one memory and stored computer program code are configured, with the at least one processor, to further cause the apparatus to cause transmission of the compressed face descriptors.

12. The apparatus according to claim 11, wherein the at least one memory and stored computer program code are configured, with the at least one processor, to cause the apparatus to cause transmission of the compressed face descriptors at least in part by causing storage of the compressed face descriptors in a memory.

13. The apparatus according to claim 11, wherein the at least one memory and stored computer program code are configured, with the at least one processor, to cause the apparatus to cause transmission of the compressed face descriptors at least in part by causing the compressed face descriptors to be sent over a network toward a remote computing device.

14. The apparatus according to claim 9, wherein the at least one memory and stored computer program code are configured, with the at least one processor, to further cause the apparatus to use the compressed face descriptors to perform image analysis without decompressing the compressed face descriptors.

15. The apparatus according to claim 14, wherein the at least one memory and stored computer program code are configured, with the at least one processor, to cause the apparatus to use the compressed face descriptors to perform image analysis without decompressing the compressed face descriptors at least in part by using a look-up table to determine an output indicative of a difference between two face descriptors being compared.

16. The apparatus according to claim 9, wherein the at least one memory and stored computer program code are configured, with the at least one processor, to cause the apparatus to determine the histogram-based face descriptors at least in part by applying a local operator to each of the plurality of regions of the face image and computing a distribution of responses to the local operator for each of the plurality of regions.

17. The apparatus according to claim 9, wherein the apparatus comprises or is embodied on a mobile phone, the mobile phone comprising user interface circuitry and user interface software stored on one or more of the at least one memory; wherein the user interface circuitry and user interface software are configured to:
  facilitate user control of at least some functions of the mobile phone through use of a display; and
  cause at least a portion of a user interface of the mobile phone to be displayed on the display to facilitate user control of at least some functions of the mobile phone.

18. A computer program product comprising at least one non-transitory computer-readable storage medium having computer-readable program instructions stored therein, the computer-readable program instructions comprising:
  program instructions configured to determine a histogram-based face descriptor for each of a plurality of regions of a face image; and
  program instructions configured to compress the histogram-based face descriptors at least in part using probability distribution encoding to encode the histogram-based face descriptors to generate a plurality of compressed face descriptors describing the plurality of regions of the face image, wherein the program instructions configured to compress the histogram-based face descriptors are further configured to ensure that the plurality of compressed face descriptors remain in the same probability simplex subspace as the histogram-based face descriptors.

19. The method of claim 1, wherein compressing the histogram-based face descriptors comprises vector quantizing the histogram-based face descriptors such that the L1 norm is preserved.

\* \* \* \* \*